(12) United States Patent
Haeberle et al.

(10) Patent No.: US 8,107,189 B2
(45) Date of Patent: Jan. 31, 2012

(54) DEVICE AND STRUCTURE FOR REDUCING TAPE MOTION AND STATIC FRICTION

(75) Inventors: Walter Haeberle, Waedenswil (CH); Mark Alfred Lantz, Adliswil (CH); Venkataraman Kartik, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/393,578

(22) Filed: Feb. 26, 2009

(65) Prior Publication Data

US 2010/0214689 A1   Aug. 26, 2010

(51) Int. Cl.
*G11B 15/00* (2006.01)

(52) U.S. Cl. ...... 360/96.1; 360/93; 360/95; 360/130.31; 242/346

(58) Field of Classification Search ............ 360/130.21, 360/130.31; 242/346, 346.1; 226/189
See application file for complete search history.

(56) References Cited

U.S. PATENT DOCUMENTS

| 4,799,117 | A  | * | 1/1989  | Ohyama        | 360/96.51 |
| 5,195,001 | A  | * | 3/1993  | Murakami et al. | 360/85   |
| 5,291,349 | A  | * | 3/1994  | Yamaguchi     | 360/84    |
| 6,466,397 | B1 | * | 10/2002 | Yokota et al. | 360/96.51 |
| 6,736,351 | B2 | * | 5/2004  | Lee et al.    | 242/615.21 |
| 7,349,176 | B2 | * | 3/2008  | Monk          | 360/94    |
| 7,440,235 | B2 | * | 10/2008 | Nayak         | 360/291.3 |

\* cited by examiner

*Primary Examiner* — Tan T. Nguyen

(74) *Attorney, Agent, or Firm* — Scully, Scott, Murphy & Presser, P.C.; Daniel P. Morris, Esq.

(57) ABSTRACT

A tape mounting apparatus for a magnetic tape data storage device which includes a movable structure movably attached to a base. The movable structure moves partially within the base and is powered by a motor unit. The moveable structure has at least a load position and a transport position. A tape guide device is positioned within the movable structure such that a tape passes over the tape guide device and between a tape reading head and the tape guide device. The base is attached to a body of a magnetic tape data storage drive.

17 Claims, 4 Drawing Sheets

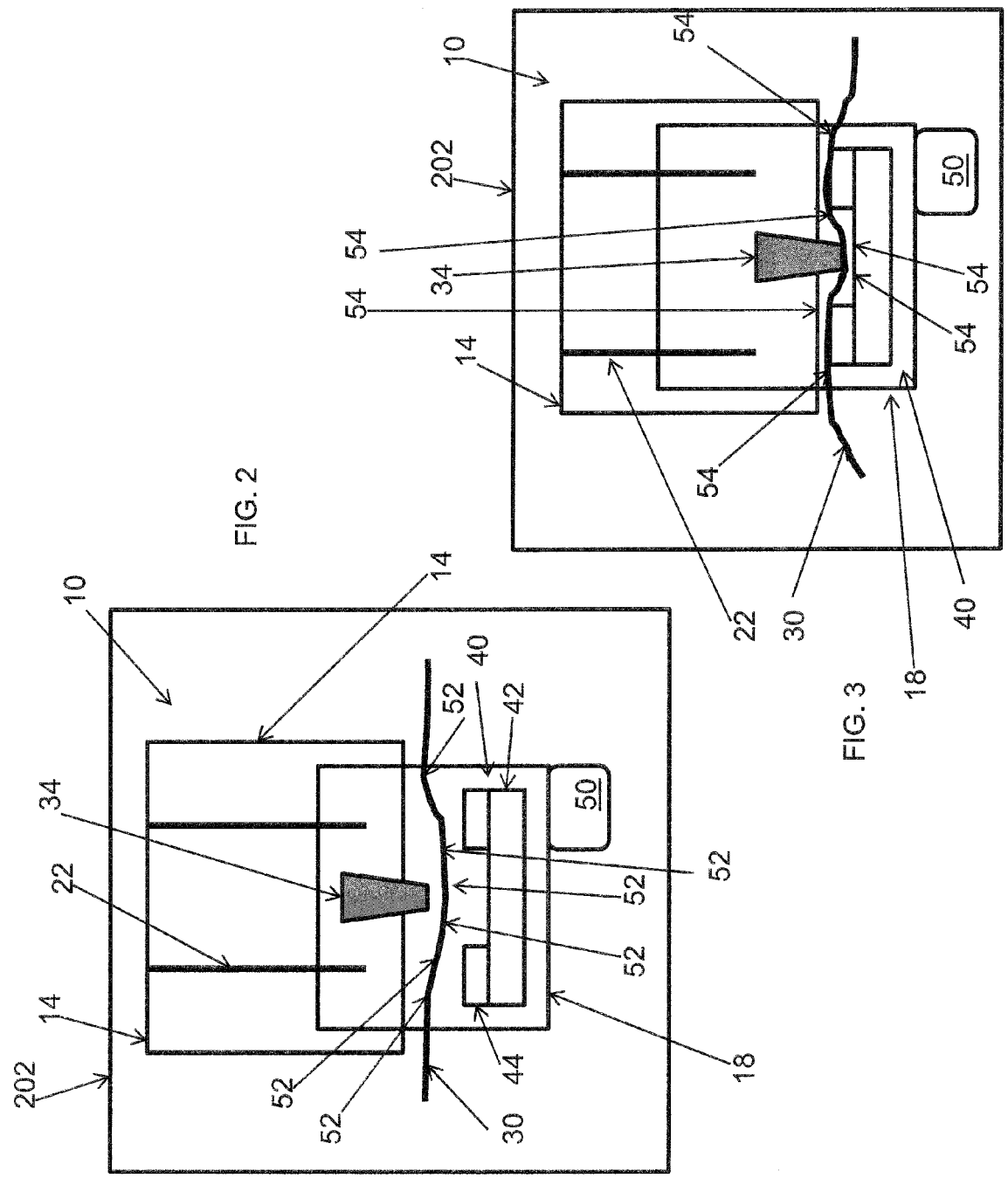

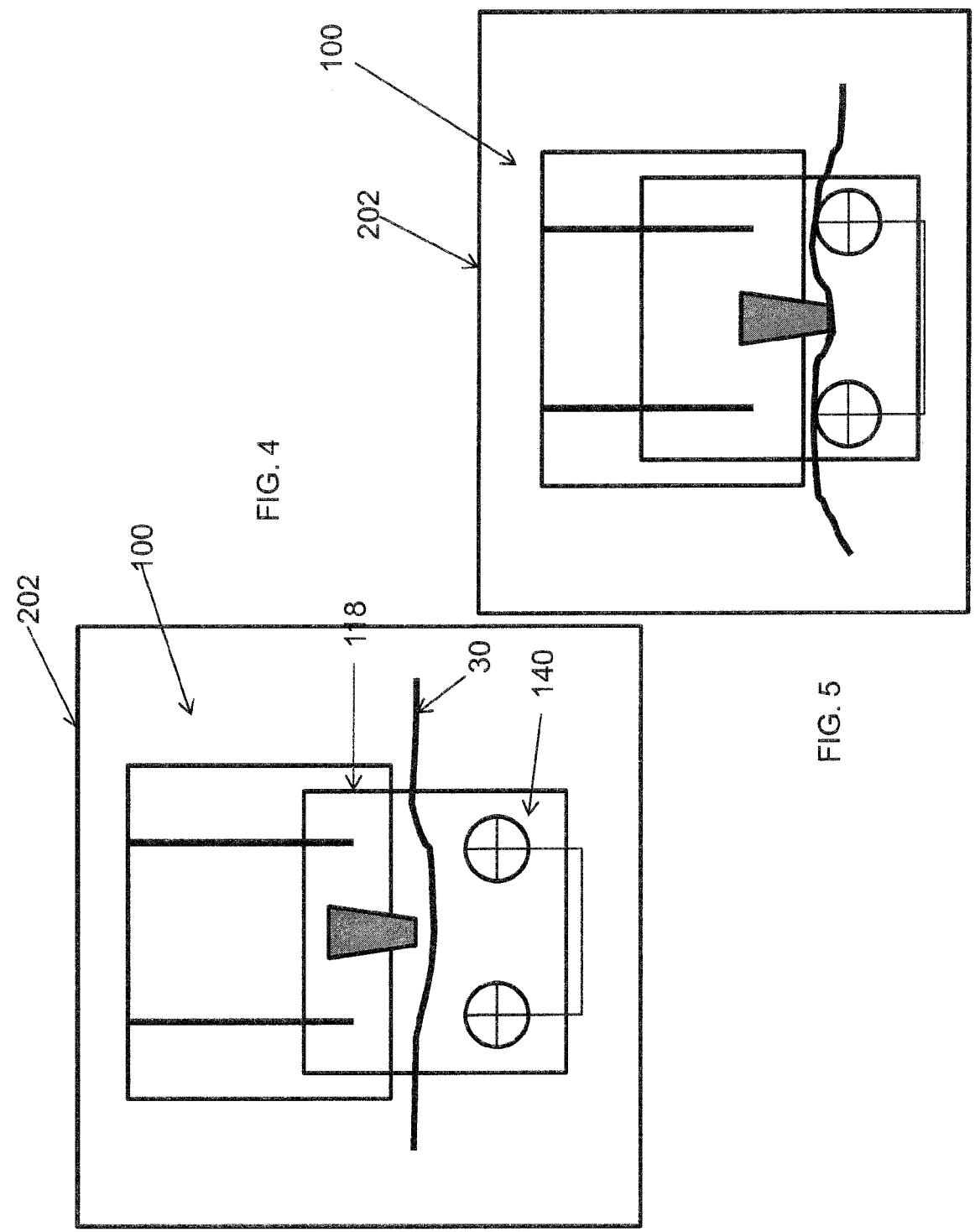

DEVICE AND STRUCTURE FOR REDUCING TAPE MOTION AND STATIC FRICTION

CROSS-REFERENCE TO RELATED APPLICATION

This application is related to the following commonly-owned, co-pending United States patent application filed on even date herewith, the entire contents and disclosure of which is expressly incorporated by reference herein as if fully set forth herein: U.S. patent application Ser. No. (22819), for "ROLLER GUIDE FOR MAGNETIC TAPE WITH MULTIPLE GUIDING SECTIONS".

FIELD OF THE INVENTION

The present invention relates to an apparatus and method for mounting a magnetic tape in a data storage device, and more particularly, relates to a multi-position apparatus and method for mounting a magnetic tape in a data storage device or system.

BACKGROUND OF THE INVENTION

Magnetic tape data storage cartridges provide long term storage of information on the magnetic tape. Magnetic tape data storage drives read and write data to the magnetic tape in the data storage cartridges. Data is written to the magnetic tape in the data storage cartridge by the magnetic tape data storage drive. Typically, a mechanism is used to load the tape onto a tape path in the magnetic tape data storage drive from a data cartridge. The mechanism may include a moving leader block that attaches to the end of the tape in the cartridge, and then moves away from the cartridge (or file reel) towards a machine reel such that the tape trails the block and is positioned between a guiding surface and a head(s).

Lateral motion of magnetic tape during read/write operations imposes constraints on the spacing of data tracks, and thereby the areal storage density that can be achieved on the tape. One approach to reducing lateral tape motion includes using high wrap angles of the tape around the guiding surfaces. Another approach includes using guide mechanisms, tools, structures, or devices for guiding the tape on its non-magnetic backcoat. A further approach includes positioning guides close to the head on either side or both sides of the head. In some embodiments, for maximum effectiveness, the above approaches are combined.

However, drawbacks of known approaches to reduce lateral motion of the tape result in at least the following problems. For example, the narrow spacing between the guides and the head does not allow a typical leader block mechanism to thread the tape path. In this case, where sufficient space is unavailable for a leader block mechanism, a leader tape mechanism is used whereby a length of leader tape always remains in the path, and the leader tape attaches to the end of the data tape and threads it in the path. However, redesigning a tape drive and replacing the leader block mechanism with a leader tape mechanism involves significant design and manufacturing changes and costs, along with constraints due to the limited available space. Such design and manufacturing changes require additional undesirable costs related to redesigning, manufacturing, and labor.

Additionally, another problem with current guide mechanisms is when using a stationary guide. When using a stationary guide, high frictional forces between the tape and the guide at the time of start up of the tape can cause the tape to stick to the surface, thereby potentially causing tape damage at the instant the tape starts moving from a stopped position. This problem can be compounded by the high wrap angles of the tape around the guides resulting in additional friction, and potential damage to the tape.

It would therefore be desirable to provide a system and method for threading a tape through a magnetic tape data storage drive from a data cartridge when the drive includes a mechanism to control lateral motion of the tape. There is a further need for the system and method to be cost efficient, including manufacturing costs and labor costs. Additionally, there is a need for a system and method to thread the tape through the storage drive without causing undesirable frictional forces on the tape during threading and during operation with frequent stopping and starting of the tape.

SUMMARY OF THE INVENTION

In an aspect of the present invention a tape mounting apparatus for a magnetic tape data storage device comprises a movable structure movably attached to a base. The movable structure moves partially within the base and is powered by a motor unit. The moveable structure has at least a load position and a transport position. A tape guide device is positioned within the movable structure, and the tape guide device is positioned such that a tape passes over the tape guide device and between a tape reading head and the tape guide device.

In a related aspect, the base is attached to a body of a magnetic tape data storage drive. The tape guide device may include a base and at least two opposing raised portions mounted to the base and defining a cavity therebetween such that the tape passes over both raised portions and the cavity. The tape guide device may also include at least one rotatable roller such that the tape passes over the roller. The load position may include the movable structure positioned a first specified distance from the tape reading head, and the transport position may include the movable structure positioned a second specified distance from the tape reading head for engaging the tape and the tape reading head and the first specified distance is greater than the second specified distance. The moveable structure may include multiple positions in relation to the tape reading head. Further, the tape guide device may include a base and at least two opposing raised portions mounted to the base and defining a cavity therebetween such that the tape passes over both raised portions and the cavity. A first position of the moveable structure in relation to the tape reading head results in first wrap angles between the tape and the raised portions and the tape reading head along a tape route. A second position of the moveable structure in relation to the tape reading head results in second wrap angles between the tape and the raised portions and the tape reading head along the tape route. The first wrap angles may be greater than the second wrap angles.

In another aspect of the invention, a method for mounting a tape in a magnetic tape data storage device comprises: providing a movable structure movably attached to a base wherein the movable structure moves partially within the base and is powered by a motor unit; positioning a tape guide device within the movable structure; positioning the tape guide device such that a tape passes over the tape guide device and between a tape reading head and the tape guide device; and moving the moveable structure into a load position and a transport position.

In a related aspect the method further comprises attaching the base to a body of a magnetic tape data storage drive. The tape may pass over raised portions and a cavity may be defined by the raised portions of the tape guide device. The method may further comprise: positioning the movable structure a first specified distance from the tape reading head in the load position; and positioning the movable structure a second specified distance from the tape reading head in the transport position for engaging the tape and the tape reading head, and the first specified distance being greater than the second specified distance. The moveable structure may include multiple positions in relation to the tape reading head. The tape guide device may include a base and at least two opposing raised portions mounted to the base and defining a cavity therebetween such that the tape passes over both raised portions and the cavity. The method may further include routing the tape between the tape and the raised portions and the tape reading head during a first position of the moveable structure in relation to the tape reading head resulting in first wrap angles between the tape and the raised portions and the tape reading head along the tape route; and routing the tape between the tape and the raised portions and the tape reading head along a tape route during a second position of the moveable structure in relation to the tape reading head resulting in second wrap angles between the tape and the raised portions and the tape reading head along the tape route. Further, the first wrap angles may be greater than the second wrap angles.

In another aspect of the invention, a magnetic tape data storage system includes a tape mounting apparatus for mounting a tape for data reading and/or writing, wherein the tape mounting apparatus further includes a movable structure movably attached to a base. The movable structure moves partially within the base and is powered by a motor unit, and the moveable structure has at least a load position and a transport position. A tape guide device is positioned within the movable structure, and the tape guide device is positioned such that a tape passes over the tape guide device and between a tape reading head and the tape guide device. At least one motor for rotating reels has the tape suspended therebetween. The apparatus includes a controller for controlling the movable structure and rotating reels, and an interface for a user to direct the controller.

In a related aspect, the tape guide device includes a base and at least two opposing raised portions mounted to the base and defines a cavity therebetween such that the tape passes over both raised portions and the cavity. The load position may include the movable structure positioned a first specified distance from the tape reading head, and the transport position may include the movable structure positioned a second specified distance from the tape reading head for engaging the tape and the tape reading head and the first specified distance may be greater than the second specified distance. The moveable structure may include multiple positions in relation to the tape reading head. The tape guide device may include a base and at least two opposing raised portions mounted to the base and define a cavity therebetween such that the tape passes over both raised portions and the cavity. A first position of the moveable structure in relation to the tape reading head may result in first wrap angles between the tape and the raised portions and the tape reading head along a tape route, and a second position of the moveable structure in relation to the tape reading head may result in second wrap angles between the tape and the raised portions and the tape reading head along the tape route.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 2 is a block diagram of the tape mounting apparatus of FIG. 1 in a loading position and depicting a tape threaded therethrough, the apparatus is attached to a base of a magnetic tape data storage device; and FIG. 3 is a block diagram of the tape mounting apparatus of FIG. 2 in a transport position wherein the tape communicates with a read/write head;

FIG. 4 is a block diagram of another embodiment of a tape mounting apparatus using a rotatable tape guiding mechanism, and the apparatus is in a loading position;

FIG. 5 is a block diagram of the tape mounting apparatus of FIG. 4 in a transport position wherein the tape is communicating with a read/write head.

DETAILED DESCRIPTION OF THE INVENTION

Figure 1:
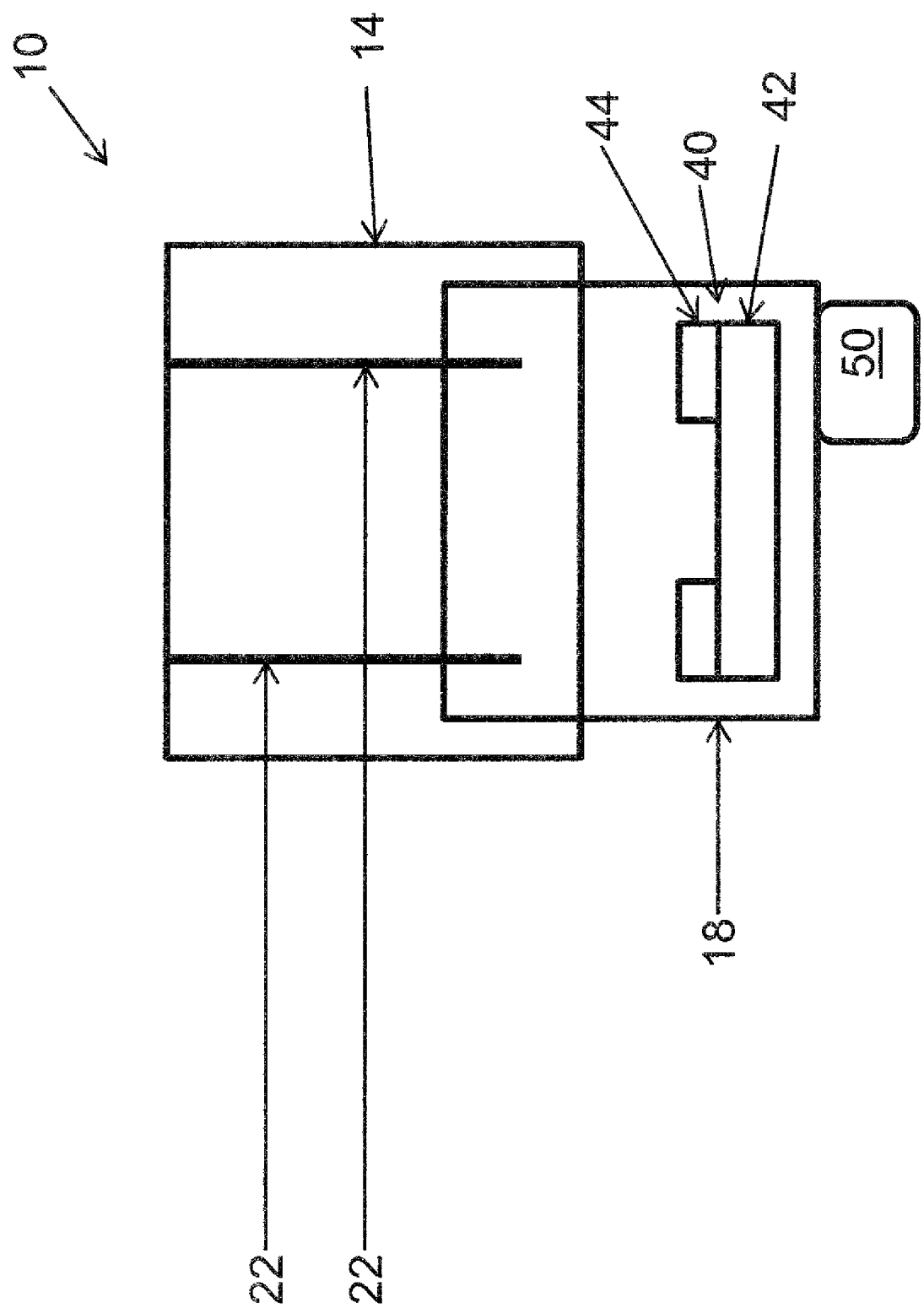
FIG. 1 is a block diagram of a tape mounting apparatus according to an embodiment of the present invention.

The exemplary embodiments of the invention shown in FIGS. 1-6 illustrate the elements of the invention and are not intended to be to scale representation of the embodiment. Referring to FIGS. 1-3, an illustrative embodiment according to the present invention of a tape mounting apparatus 10 includes a base 14. A movable structure 18 moves partially within the base 14, for example on rails 22 as shown in FIGS. 1-3. Referring to FIGS. 2 and 3, the apparatus 10 is connected to the body 202 of the tape drive 200 (FIG. 6), and a tape 30 is threaded between a read/write head 34 and a tape guide device embodied as stationary tape guide device 40 is affixed in the movable structure 18. The tape guide device 40 includes a base 42 and two opposing raised portions 44 mounted to the base 42 such that the tape 30 passes over both raised portions and is able to sag in the cavity therebetween.

The base 14 may be manufactured separately and then fixed to the body 202 of the tape drive 200 by fastening the base 14 to the body 202 using fastening devices, e.g., screws. Alternatively, the base 14 may be manufacture integrally with the body 202 and the moveable structure 18 mounted on the rails 22 during manufacturing.

Alternatively, a tape guide device may be embodied as a roller type tape guide device 140 (shown in FIG. 4) which includes roller mounted on an axel. The movable structure 18 is electrically powered by an actuating mechanism 50 which may generate motion piezo-electrically, using a battery, or through other methods. The actuation mechanism 50 moves the structure 18 to one of two positions, hereinafter referred to as the tape loading position and the tape transport position. Other positions, more than two, are also possible, presenting alternative embodiments to the two positions herein described. The tape mounting apparatus is positioned near the read/write head 34.

The moveable structure 18 may have multiple positions in reference to the head 34 In FIGS. 2 and 3, the moveable structure 18 is shown in two positions. Alternatively, the moveable structure 18 can multiple positions in relation to the head 34. For example, a position of the moveable structure 18 in relation to the head 34 which is close to the head 34, requires higher wrap angles around the raised portions 44 of the tape guide device 40 and the head 34. The positions of the moveable structure 18 can depend on tape characteristics, e.g., tape thickness and/or width, or the speed the tape is transported.

Alternatively, the moveable structure 18 can advance toward or away from the head when the tape is in motion, such that the wrapping angle of the tape 30 is increased or decreased, respectively. In this embodiment, the tape 30 can start to move with low wrap angles (which lead to lower static friction), and then, once the tape 30 is in motion the moveable structure 18 can be gradually moved closer to the head 34 (increasing the wrap angles and frictional forces), and thereby improving guiding and reducing lateral tape motion.

Referring to FIGS. 2 and 3, operating the tape mounting apparatus 10 according to an embodiment of a method of the present invention includes the tape mounting apparatus 10 in the loading position (FIG. 2) when loading the tape 30 between the read/write head 34. The moveable structure 18 in the loading position is positioned such that a clearance is left between the read/write head 34 and the guide device 40 mounted on the movable structure 18. A leader block mechanism (not shown) can load/thread tape between the head and the adjacent guides. The moveable structure 18 then moves into the transport position as shown in FIG. 3. In the transport position the moveable structure 18 advances toward the read/write head 34 and stops at a final position engaging the tape 30, wherein the tape is simultaneously in contact with the raised portions 44 of the tape guide 40 and the read/write head 34.

A leader block mechanism, for example, may include a small fixture mounted on a moving arm. When a new cartridge is loaded into the tape drive 200, the fixture attaches itself to the end of the tape 30 in a tape cartridge (not shown) and is moved by the arm following a path over the guides 44 and head 34, and finally into a slot in a machine reel (for example, FIG. 6, reels 206). In one embodiment, at locations where one guiding surface and another guide or head lie on opposite side of the tape, the tape has to be threaded through the gap between them. While a thin tape can pass through the gap, the gap must be wide enough such that the relatively larger leader blocks or fixtures can also pass through the gap. The gap requirement may limit the minimum gap between the head and the adjacent guides.

Thereby, the tape mounting apparatus 10 of the present invention provides tape 30 threading by moving the movable structure 18 from a load position to transport position. Thus, threading the tape 30 is achieved without having to replace an existing leader block mechanism. Further, the apparatus 10 provides tape 30 guidance using the tape guide 40 while avoiding steep tape angles, and additional tape contact with numerous members which can cause high friction forces on the tape and lead to tape damage notably when the tape is started and stopped.

More specifically, when the tape starts from rest on a guiding surface, especially a smooth surface, a large amount of static friction (or stiction) can arise and result in the tape sticking the surface. High friction can prevent the tape from moving during start-up of winding by the reels. More particularly, static friction arises only at the instant when the tape is about to move, and reduces to a lower value of kinetic friction once there is relative motion between the tape and any surface or combination of surfaces such as the guides 44 and/or tape head 34. This can not only cause problems with the tape transport control system, but can also potentially cause physical damage to the tape. Typically, a greater angular tape wrap about the guiding surfaces or the tape head generates higher static friction. However, the high angular wrap is beneficial for tape guiding after the tape has started moving as it helps to control lateral motion. The two conflicting or competing requirements of low angle wrap during start-up and high angle wrap during steady operation can be satisfied using the present invention which can adjusts tape wrap angle after startup. Referring to FIGS. 2 and 3, tape 30 bend areas 52 and 54, respectively, occur at the junctions between the tape 30 and the beginning and end of the guides 44 along the tape 30 route through the structure 18, and at the junctions between the tape 30 and the beginning and end of the tape head 34 along the tape route. Each of the tape bend areas 52, 54 defines an angle with its respective receiving element, i.e., guides 44 and head 34, as the tape 30 travels through the structure 18. The acuteness of the angles defined by the tape bend areas 52, 54 results in higher or lower wrap angles of the tape 30 through the structure 18.

Figure 6:
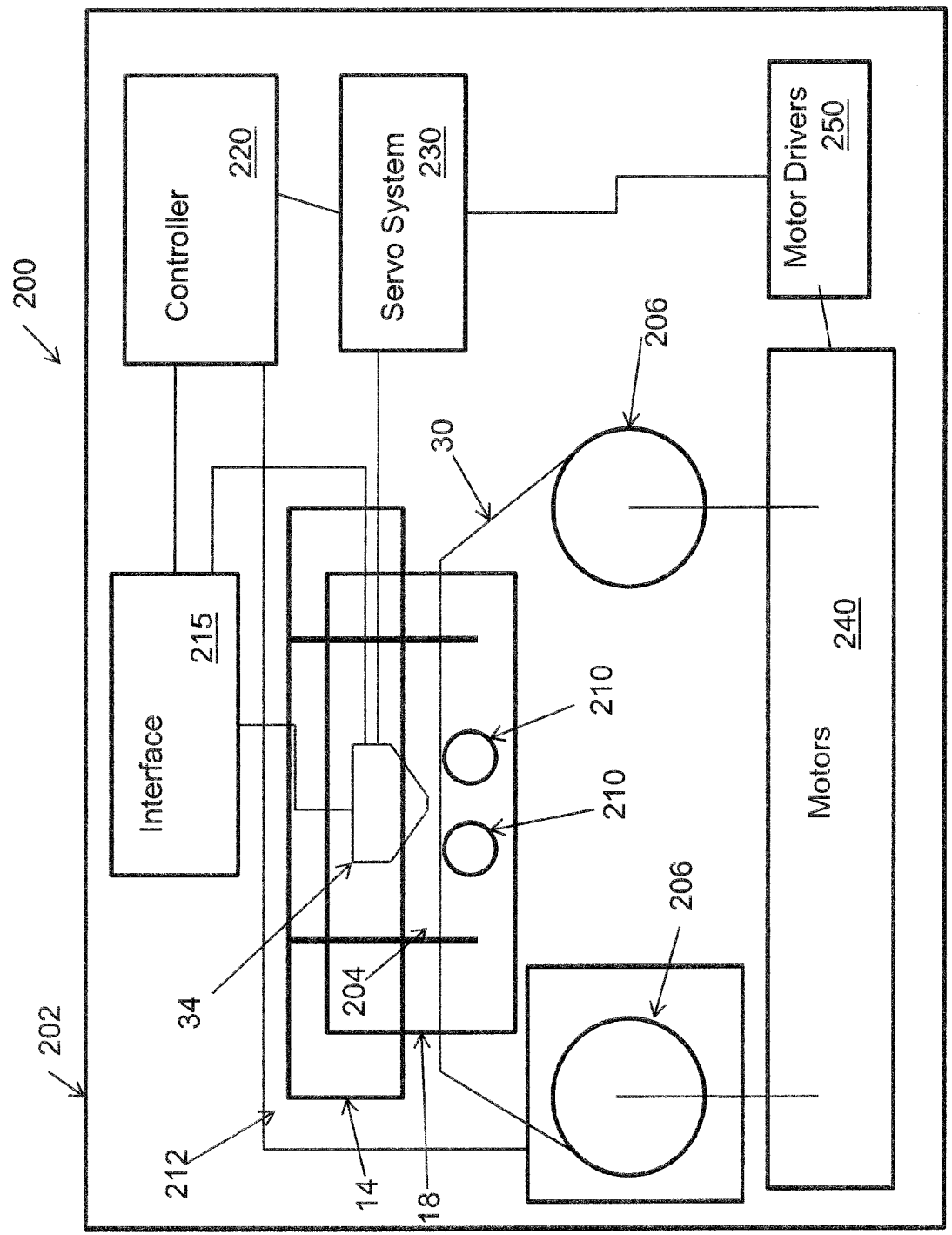
FIG. 6 is a schematic block diagram of a magnetic tape data storage system according to an embodiment of the present invention including the tape mounting apparatus of the present invention.

Referring to FIGS. 4 and 5, a tape mounting apparatus 100 according to another embodiment of the present invention differs from the apparatus 10 shown in FIGS. 1-3, in that the tape guide device 40 is replaced by a tape roller guide device 140. The tape roller guide device 140 includes two round cylindrically shaped roller guides 144 which are laterally opposed and mounted on a support 142. The tape apparatus 100 is attached to a body 202 of a magnetic tape data storage device or system 200 (FIG. 6). Where the tape apparatus 100 includes the same elements as the tape apparatus 10, the reference numerals are the same. The tape apparatus 100 operates in a similar fashion to the tape apparatus 10 shown in FIGS. 2 and 3. The tape 30 is loaded between the read/write head 34 and the tape roller guide device 140 when the moveable structure 18 is in a load position. Similarly with the apparatus 10 shown in FIGS. 2 and 3, the moveable structure 18 then moves into the transport position as shown in FIG. 5. In the transport position the moveable structure 18 advances toward the read/write head 34 and stops at a final position engaging the tape 30, wherein the tape is simultaneously in contact with the roller guides 144 of the roller tape guide 140 and the read/write head 34.

Referring to FIG. 6, the magnetic tape data storage system 200 according to an embodiment of the present invention includes a body 202 for attaching the tape mounting apparatuses 10 and 100 (shown in FIGS. 1-5). Another embodiment of a tape mounting apparatus 212 according to the present invention includes cylindrical guide devices 210 positioned beneath the tape 30 suspended between two reels 206 (or tape cartridges). In the system 200 shown in FIG. 6, like elements of the apparatuses 10 and 100 have the same reference numerals as in FIGS. 1-5. The read/write head 34 reads and/or writes information on the magnetic tape 30 as the tape 30 is moved longitudinally by one or more motors 240 which rotate the reels 206. The system 200 includes the moveable structure 18 movably attached to the base 14, and the base 14 is attached to the body 202 of the storage system 200. The read/write head 34 is electrically connected to an interface 215 for a user to control the system. The interface is electrically connected to a controller 220 to implement the user's instructions in conjunction with a servo system 230. According to the user's instructions, motors 240 and motor drivers 250 operate reels 206 mounted on axels 208.

The tape mounting apparatus 10 may be fitted (retrofitted) into an existing machine, or a new magnetic tape data storage device or system 200 may be manufactured for integrating the tape mounting apparatus 10.

While the present invention has been particularly shown and described with respect to preferred embodiments thereof it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A tape mounting apparatus for a magnetic tape data storage device, comprising:
   a movable structure movably attached to a base wherein the movable structure moves partially within the base and is powered by a motor unit, the moveable structure having at least a load position and a transport position; and
   a tape guide device positioned within the movable structure, the tape guide device positioned such that a tape passes over the tape guide device and between a tape reading head and the tape guide device;
   wherein the tape guide device includes a base and at least two opposing raised portions mounted to the base which define a cavity therebetween such that the tape passes over both raised portions and the cavity.

2. The apparatus of claim 1, wherein the base is attached to a body of a magnetic tape data storage drive.

3. The apparatus of claim 1, wherein the tape guide device includes at least one rotatable roller such that the tape passes over the roller.

4. The apparatus of claim 1, wherein the load position includes the movable structure positioned a first specified distance from the tape reading head, and the transport position includes the movable structure positioned a second specified distance from the tape reading head for engaging the tape and the tape reading head and wherein the first specified distance is greater than the second specified distance.

5. The apparatus of claim 1, wherein the moveable structure includes multiple positions in relation to the tape reading head.

6. The apparatus of claim 5, wherein a first position of the moveable structure in relation to the tape reading head results in first wrap angles between the tape and the raised portions and the tape reading head along a tape route, and a second position of the moveable structure in relation to the tape reading head results in second wrap angles between the tape and the raised portions and the tape reading head along the tape route.

7. The apparatus of claim 6, wherein the first wrap angles are greater than the second wrap angles.

8. A method for mounting a tape in a magnetic tape data storage device, comprising:
   providing a movable structure movably attached to a base wherein the movable structure moves partially within the base and is powered by a motor unit;
   positioning a tape guide device within the movable structure;
   positioning the tape guide device such that a tape passes over the tape guide device and between a tape reading head and the tape guide device; and
   moving the moveable structure into a load position and a transport position;
   wherein the tape passes over raised portions and a cavity defined by the raised portions of the tape guide device.

9. The method of claim 8, further comprising:
   attaching the base to a body of a magnetic tape data storage drive.

10. The method of claim 8, further comprising:
    positioning the movable structure a first specified distance from the tape reading head in the load position; and
    positioning the movable structure a second specified distance from the tape reading head in the transport position for engaging the tape and the tape reading head, and the first specified distance being greater than the second specified distance.

11. The method of claim 8, wherein the moveable structure includes multiple positions in relation to the tape reading head.

12. The method of claim 11, wherein the tape guide device includes a base and at least two opposing raised portions mounted to the base and defining a cavity therebetween such that the tape passes over both raised portions and the cavity; and the method includes:
    routing the tape between the tape and the raised portions and the tape reading head during a first position of the moveable structure in relation to the tape reading head resulting in first wrap angles between the tape and the raised portions and the tape reading head along the tape route; and
    routing the tape between the tape and the raised portions and the tape reading head along a tape route during a second position of the moveable structure in relation to the tape reading head resulting in second wrap angles between the tape and the raised portions and the tape reading head along the tape route.

13. The apparatus of claim 12, wherein the first wrap angles are greater than the second wrap angles.

14. A magnetic tape data storage system, comprising:
    a tape mounting apparatus for mounting a tape for data reading and/or writing, wherein the tape mounting apparatus further includes:
    a movable structure movably attached to a base wherein the movable structure moves partially within the base and is powered by a motor unit, the moveable structure having at least a load position and a transport position;
    a tape guide device positioned within the movable structure, the tape guide device positioned such that a tape passes over the tape guide device and between a tape reading head and the tape guide device;
    at least one motor for rotating reels suspending the tape therebetween;
    a controller for controlling the movable structure and rotating reels; and
    an interface for a user to direct the controller;
    wherein the tape guide device includes a base and at least two opposing raised portions mounted to the base which define a cavity therebetween such that the tape passes over both raised portions and the cavity.

15. The system of claim 14, wherein the load position includes the movable structure positioned a first specified distance from the tape reading head, and the transport position includes the movable structure positioned a second specified distance from the tape reading head for engaging the tape and the tape reading head and wherein the first specified distance is greater than the second specified distance.

16. The system of claim 14, wherein the moveable structure includes multiple positions in relation to the tape reading head.

17. The system of claim 14, wherein a first position of the moveable structure in relation to the tape reading head results in first wrap angles between the tape and the raised portions and the tape reading head along a tape route, and a second position of the moveable structure in relation to the tape reading head results in second wrap angles between the tape and the raised portions and the tape reading head along the tape route.

* * * * *